United States Patent [19]

La Rocco

[11] 4,070,012
[45] Jan. 24, 1978

[54] ADAPTOR FOR MACHINE TOOL FIXTURE

[76] Inventor: Lawrence La Rocco, 826 N. Grant St., Addison, Ill. 60101

[21] Appl. No.: 672,734

[22] Filed: Apr. 1, 1976

[51] Int. Cl.² .............................................. B23Q 3/06
[52] U.S. Cl. .................................. 269/287; 269/321 N
[58] Field of Search ...................... 269/76, 80, 82, 126, 269/129, 287, 321 N, 97; 51/216 R, 217 R

[56] References Cited

U.S. PATENT DOCUMENTS

| | | | |
|---|---|---|---|
| 2,108,077 | 2/1938 | Robinson | 269/321 N |
| 2,364,150 | 12/1944 | Lowenstein | 269/321 N |
| 2,371,831 | 3/1945 | Leming | 269/321 N |
| 2,455,024 | 11/1948 | Schneider | 269/321 N |
| 3,376,674 | 4/1968 | Ernesto | 51/216 R |

Primary Examiner—Robert C. Watson
Attorney, Agent, or Firm—Merriam, Marshall & Bicknell

[57] ABSTRACT

An adaptor device for use with a fixture for holding a tool piece in position, the adaptor comprising first and second portions, the first portion being locked in the fixture and the second portion, which extends out from the first portion, serving to hold a tool piece upon which one or more machining operations are to be performed.

6 Claims, 5 Drawing Figures

ADAPTOR FOR MACHINE TOOL FIXTURE

BACKGROUND OF THE INVENTION

This invention relates to a device for use with a fixture and more particularly to an adaptor device for use with a fixture in which the adaptor serves to properly hold and orient a tool piece upon which work is to be performed.

Fixtures are often employed to hold tools or other materials which are to be worked to a particular shape. One such fixture is a guiding fixture shown and disclosed in U.S. Pat. No. 3,094,821. That fixture employs a tool base having a V-shaped seat in which a tool to be ground is positioned and maintained by means of a yoke and set screw arrangement. While this fixture has proved satisfactory as a grinding fixture, in some instances it is not satisfactory. This is particularly the case when a tool upon which machining operations are to be performed is quite small, as for example a pin having a diameter of 0.064 inches which is to be ground down to a diameter of 0.012—0.032 inches. It has been found that the tool to be worked upon is not held down properly with the present grinder fixture such that a tool will move in the course of a grinding operation, thereby destroying the tool. Further, it has been found that in some instances the grinding device, in the course of a grinding operation on a tool piece positioned in the grinding fixture, contacts and damages the grinding fixture. In other words, the fixture adversely interferes with the grinding operation which results in damage to the grinding fixture as well as the tool piece upon which a grinding operation is being performed.

SUMMARY OF THE INVENTION

Accordingly, it is desired to have some means for properly holding and orienting a tool in the rotatable fixture whereby a grinding or other operation can be undertaken on a tool piece without having the grinding tool contact the fixture. It is further desired to provide for the grinding of a relatively small tool piece without having the tool piece move during the grinding operation, which serves to damage and in some instances destroy the tool piece.

With the view of obviating the problems associated in the utilization of fixtures presently available, and particularly the grinding fixture shown in U.S. Pat. No. 3,094,821, the invention disclosed and claimed herein relates to a device which is adapted to be placed in the tool base of the grinding feature. The adaptor device projects out from the tool base so that a tool piece upon which work is to be completed can be positioned in the adaptor device, and work can be performed on it without concern that the tool will move during a machining operation, or that the fixture will be contacted by the grinding device.

The adaptor device includes a first portion designed to be positioned in the V-shaped seat of the tool base of the grinder fixture and a second tool holding portion in which a tool to be worked upon is securely positioned.

The adaptor device serves to allow a grinding or other operation to be performed on the tool without interfering with the fixture and without undesired movement of the tool in the course of the operation on the tool.

BRIEF DESCRIPTION OF THE DRAWINGS

The invention will be better understood from the detailed description thereof, taken in conjunction with the accompanying drawings, in which.

DETAILED DESCRIPTION OF THE DRAWINGS

Figure 1:
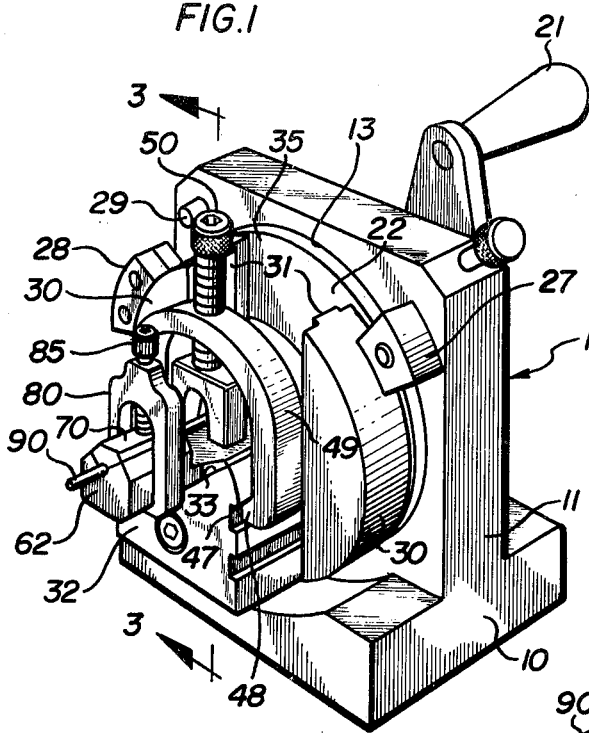
FIG. 1 shows a perspective view illustrating a prior art grinding fixture with the adaptor device of the present invention positioned in the base of the fixture.
Figure 2:
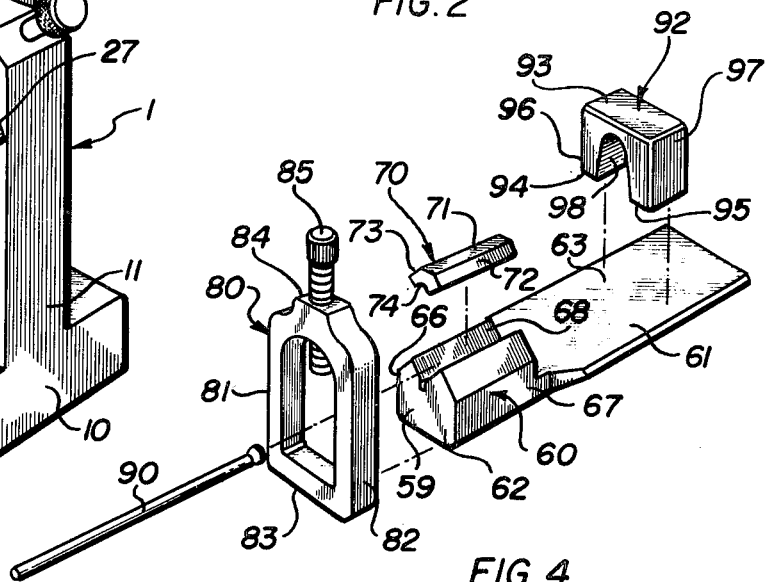
FIG. 2 shows a perspective view of the adaptor device of the present invention and a tool to be operated upon.

Referring to the drawings and more particularly FIG. 1, there is illustrated a grinding fixture 1 which is shown and disclosed in U.S. Pat. No. 3,094,821. Fixture 1 includes base 10 and mounting block 11 having formed therein a transversely extending opening 13 within which is arranged index plate 14. Plate 14 includes a sleeve 19 through which a shaft, not shown, projects. Handle 21, which facilitates rotation of plate 14, is attached to the shaft. Plate 14 is fixed to a face plate 22 by bolts, not shown, to permit plate 14 and face plate 22 to rotate about their long axes. The free rotation of index plate 14 and face plate 22 relative to mounting block 11 is provided by a raceway in block 11. The raceway is provided with suitable bearings, neither of which are shown.

The peripheral edge of place 22 has stops 27,28 attached thereto so that the stops can engage stop pin 29 on block 11 for the purpose of limiting the degree of rotation of the tool holder.

Guideplates 30 are secured to plate 22 and each has a rib 31. Tool base 32 has an inner portion which projects into the recess 35 forward of ribs 31. The tool base is clamped by means of a clamping plate 37 having vertical side portions which engage the opposite sides of ribs 31.

Base 32 has oppositely disposed parallel grooves 47 arranged in pairs to selectively receive the inturned ends 48 of a yoke 49. Yoke 49 carries a thread bearing set screw 50 which is adapted to be threaded to move vertically relative to threaded yoke opening 51.

Further details of the fixture are set forth with more particularity in U.S. Pat. No. 3,094,821.

Tool base 32 has a V-shaped seat 33. An adaptor device 60 is situated in seat 33. Adaptor 60 comprises first and second portions 61,62 which are integral with each other. Portion 61 includes substantially flat top wall 63 and walls 64,65 which are angled to correspond to the V-shape of seat 33.

Figure 3:
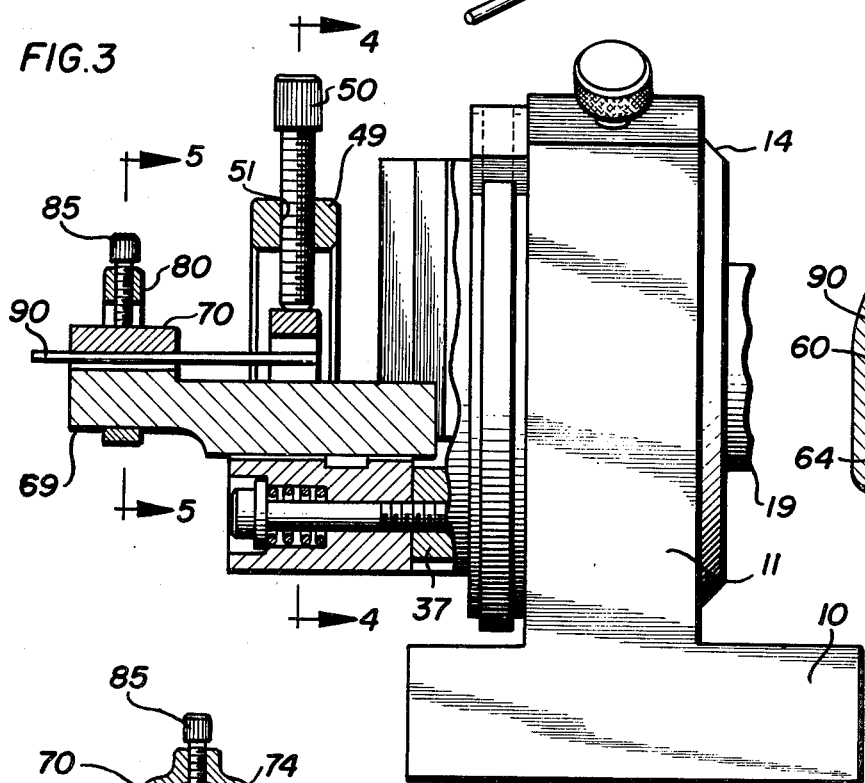
FIG. 3 shows a section view of the grinding fixture and adaptor device taken along lines 3—3 of FIG. 1.
Figure 4:
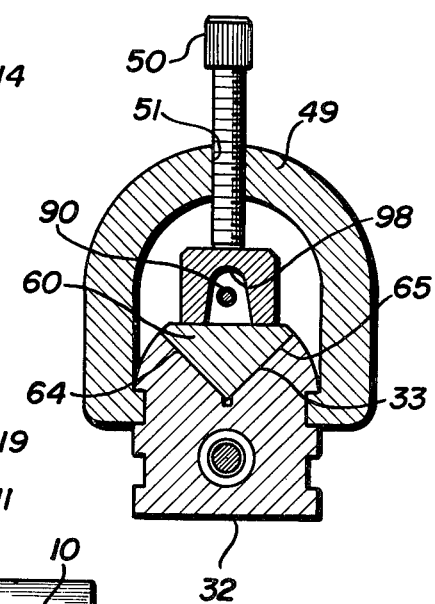
FIG. 4 shows a partial section view of the grinding fixture and adaptor device taken along lines 4—4 of FIG. 3; and, FIG. 5 shows a partial section view of a tool positioned in the V-shaped seat of the adaptor device of the present invention taken along lines 5—5 in FIG. 3.

The second portion of adaptor 60 includes side walls 66,67 and a V-shaped seat or rest 68. Seat 68 is located so that it is above wall 63 so that a tool place in rest 68 will be above wall 63 as seen in FIG. 3. The bottom wall 69 of second portion 62 is substantially flat and is positioned above a line which passes through the edge formed by tapered walls 64,65.

A collar 70 is adapted to seat in the V-shaped seat 68. Collar 70 is the same length as the length of seat 68 and includes wall 71 and side walls 72,73 which are adapted to mate with the V-shaped walls forming seat 68. Collar 70 includes a radiused surface 74.

Yoke 80, which includes sides 81, 82, bottom 83, and top 84, is adapted to fit over second portion 62 with the sides 81, 82 being slidably engageable with walls 66, 67 when yoke 80 is placed on adaptor device 60. The top of the yoke is threaded to receive set screw 85 which is adapted to be threaded relative to top 84 to contact collar 70 which is positioned on top of a tool piece 90, upon which one or more machining operations are to be performed.

In operation, first portion 61 of adaptor device 60 is placed in V-shaped seat 33. Set screw 50 is threaded in yoke 49 until screw 50 contacts wall 63 of portion 61, thereby locking adaptor device 60 in fixture 1.

If desired, a block 92 can be placed upon wall 63. Block 92 includes top 93, bottom walls 94,95 and side walls 96,97. The block is recessed or grooved at 98 so that a portion of tool piece 90 can extend along the length of portion 61 as shown in FIG. 3 without contacting set screw 50. Screw 50 is then turned until it contacts top 93, thereby maintaining adaptor device 60 in position without interfering or contacting tool piece 90.

Figure 5:
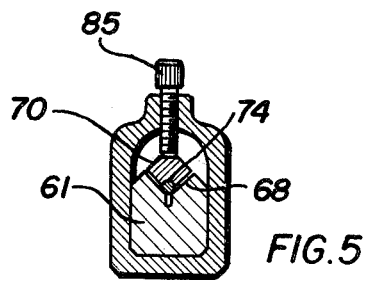

Tool piece 90, upon which machining operations are to be performed, is positioned in seat 90 of portion 62. If desired, collar 70 is placed upon tool 90, as illustrated in FIG. 5, whereupon set screw 85 is turned until it contacts the top of collar 70 whereupon tool piece 90 is locked and retained in position. In some instances it may not be necessary to use collar 70 for maintaining a tool piece in position but instead set screw 85 can be turned to contact the tool piece and hold it in place in seat 68. That portion of tool piece 90 on which work is to be performed extends outward beyond face 59 of second portion 62. Yoke 80 is positioned relative to portion 62 so that it is not contiguous to face 59.

The adaptor of the present invention allows machining operations to be performed on a tool without contacting the fixture 1. Further small tool pieces can be used with the adaptor device of the present invention. For example, tool pieces having a diameter of one-sixteenth inch can be ground employing the adaptor device of the present invention with a fixture such as illustrated in U.S. Pat. 3,094,821.

The foregoing detailed description has been given for clearness of understanding only, and no unnecessary limitations should be understood therefrom, as modifications will be obvious to those skilled in the art.

What is claimed is:

1. A tool holding device adapted for use with a fixture having a seat therein and a locking means normally adapted for maintaining a tool in position in said fixture seat, said tool holding device comprising:
    a first portion comprising means for mating with said fixture seat to enable said fixture locking means to lock and maintain said device in said fixture seat;
    a second portion connected to and extending outwardly from said first portion and comprising means for seating at least a portion of a tool in a position whereby said tool portion is spaced from said fixture to allow a machining operation to be performed on said tool portion; and
    said first portion includes a top and a pair of said walls wherein said side walls are V-shaped.

2. A device in accordance with claim 1 wherein said second portion includes a pair of side walls and said tool seating means is positioned above said top wall of said first portion whereby when a tool is positioned in said second portion seating means, it will not contact said top wall.

3. A device in accordance with claim 1 and further including a collar means adapted to be positioned to contact a tool in said seating means of said second portion whereby said collar means is maintained in position by said locking means 4. A device in accordance with claim 3 wherein said locking means include a yoke having a pair of spaced side walls adapted to slidably engage with said second portion side walls; a threaded top and a bottom; and, a screw means adapted to be threaded in said threaded top whereby said screw means is adapted to contact a tool or said collar means.

5. A device in accordance with claim 1 and further including a spacing block having a groove therein, said spacing block being adapted to be positioned on said top wall of said first portion whereby said first portion whereby said fixture lacking means can contact said block and a tool to be machined can extend along a portion of the length of said first portion and through said groove of said block without contacting said fixture lacking means.

6. A tool holding device in accordance with claim 2 and further including means for lacking a tool placed in said tool seating means.

* * * * *

UNITED STATES PATENT OFFICE
CERTIFICATE OF CORRECTION

Patent No. 4,070,012               Dated January 24, 1978

Inventor(s) Lawrence La Rocco

It is certified that error appears in the above-identified patent and that said Letters Patent are hereby corrected as shown below:

Column 2, line 42, change "Guideplates" to --Guide plates--;
Column 4, lines 41-42, delete "first portion whereby said";
Column 4, line 42, change "lacking" to --locking--;
Column 4, line 48, change "lacking" to --locking--.

Signed and Sealed this

Sixteenth Day of May 1978

[SEAL]

Attest:

RUTH C. MASON
Attesting Officer

LUTRELLE F. PARKER
Acting Commissioner of Patents and Trademarks